United States Patent [19]

Uesugi

[11] 4,416,513
[45] Nov. 22, 1983

[54] AUTOMATIC AND MANUAL FOCUS CONTROL FOR OBJECTIVE LENS ASSEMBLY

[75] Inventor: Kyozo Uesugi, Sakai, Japan

[73] Assignee: Minolta Camera Kabushiki Kaisha, Osaka, Japan

[21] Appl. No.: 167,303

[22] Filed: Jul. 10, 1980

[30] Foreign Application Priority Data

Jul. 16, 1979 [JP] Japan .................................. 54-90510

[51] Int. Cl.³ ............................ G02B 7/04; G03B 3/00
[52] U.S. Cl. ...................................... 350/255; 354/195
[58] Field of Search ................... 350/255, 430; 354/25, 354/195, 286

[56] References Cited

U.S. PATENT DOCUMENTS 3,884,555  5/1975  Suwa et al. ........................... 350/430
4,231,646 11/1980  Iida ...................................... 354/195
4,272,174  6/1981  Terramoto et al. ............... 354/25 N

*Primary Examiner*—F. L. Evans
*Attorney, Agent, or Firm*—Wolder, Gross & Yavner

[57] ABSTRACT

A lens is provided with a first and second lens groups which can focus not only with their concurrent movement along the optical axis but also with the movement of either one of the two lens groups. The first and second lens groups are respectively carried by first and second movable barrels. First means is provided for shifting both of first and second movable barrels concurrently in accordance with manual focus control. Second means is provided for shifting the second movable barrel without causing any movement of the first movable barrel. Thus, members to be moved for focusing upon automatic focus control are less in number in comparison with the members upon manual focus control.

13 Claims, 8 Drawing Figures

AUTOMATIC AND MANUAL FOCUS CONTROL FOR OBJECTIVE LENS ASSEMBLY

BACKGROUND OF THE INVENTION

1. Field of the Invention

The present invention relates to an objective lens barrel for use in cameras such as 35 mm single lens reflex (SLR) camera, motion picture cameras and TV cameras, and more particularly to a lens barrel capable of being automatically and manually controlled to adjust the focus of the objective lens.

2. Description of Prior Art

In prior art Japanese Patent Application laid open under No. 50-151144, an attachment for automatic focus control was proposed, which is driven by an automatic focus control device, and which may be coupled with the focus control ring of a lens barrel. In the case of automatic focus control, the attachment is coupled with the focus control ring for rotating it by the automatic focus control device. The attachment may be disengaged from the focus control ring for allowing the free rotation thereof for manual focus control. Thus, the focus control can be achieved alternatively by manual control means or automatic control means.

In the above mentioned prior art, however, the automatic focus control device is required to have considerable power in order to drive the attachment overcoming the resistance provided in the focus control ring of the lens barrel for preventing undesirable or unexpected movement thereof. Further, the use of such a prior art focus control device results in an inconvenience for manual focus control operation as well as bulkiness, and unshapeliness of the camera since the attachment is to be engaged with the lens barrel on the outside thereof at the focus control ring.

SUMMARY OF THE INVENTION

The object of the present invention is to provide a novel lens barrel capable of being controlled by both manual and automatic focus control means.

Another object of the present invention is to provide a lens barrel capable of being controlled by a focus control ring as in a conventional lens barrel, and also by an automatic focus control device having relatively small driving power.

Still another object of the present invention is to provide a lens barrel capable of being automatically controlled without interfering with manual focus control.

According to the present invention, the lens system is provided with first and second lens groups which can change focus of the lens system not only with their integral movement along the optical axis but also with the axial movement of either one of the two lens groups. The first and second lens groups are respectively carried by first and second movable barrels. First means is provided for shifting both of the first and second movable barrels concurrently in accordance with manual focus control. Second means is provided for shifting the second movable barrel without causing any movement of the first movable barrel. Thus, with the structure of the present invention, members to be moved for focusing by automatic focus control is less in number in comparison with the members upon manual focus control.

According to one feature of the present invention, the mechanisms for manual focus control and automatic focus control may be actuated independently of each other, and the automatic focus control can be carried out at any manually controlled focus condition. In other words, the operations of both mechanisms may be associated to provide a focus as a sum of the adjustments by the manual control and automatic control. With this feature, the second lens group may be moved for a small distance upon automatic focus control, which enables quick response of the automatic focus control system. In addition, due to the independence of each other, the two mechanisms can have respectively adequate operational torques for driving the lenses.

Further, selection of the manual and automatic focus control modes can be made only by decoupling and coupling the automatic focus control mechanism with the second movable barrel carrying the second lens group thereby facilitating the switching of the focus control mode. When the coupling is made, the second movable barrel is driven relative to the first movable barrel carrying the first lens group by the automatic focus control mechanism as well as with the first movable barrel by the manual focus control mechanism. In this case, if either one of the automatic and manual focus control mechanism is set to its initial position, the focusing depends on only the other.

According to an embodiment of the present invention, means are provided for returning the second movable barrel to its initial position relative to the first movable barrel when the second movable barrel is decoupled from the automatic focus control mechanism.

According to a feature of the embodiments, an indication means is provided for indicating one or more ranges of object distance for which the lens system can be focused by the automatic focus control system, thereby enabling the user to determine whether he should select the automatic or manual focus control mode. Furthermore, another indication means may be provided for warning the user when the second movable barrel is driven by the automatic focus mechanism to one extremity of the available range.

Other and further objects of this invention will become obvious upon an understanding of the illustrative embodiments about to be described or will be indicated in the appended claims, and various advantages not referred to herein will occur to one skilled in the art upon employment of the present invention.

DETAILED DESCRIPTION OF THE PREFERRED EMBODIMENTS

Figure 1:
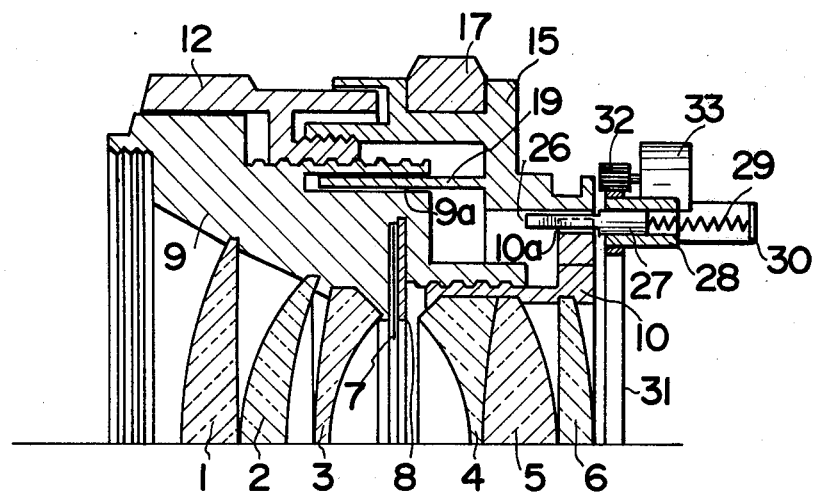
FIG. 1 is a semi cross-sectional view of a first embodiment of the present invention.

With reference to FIG. 1, lenses 1 through 3 are supported by first movable barrel 9 and lenses 4 through 6 by second movable barrel 10, respectively. Diaphragm blades 7 and diaphragm actuating plate 8 are disposed between lenses 3 and 4 and are supported by first movable barrel 9. Diaphragm actuating plate 8 is rotatable in response to the manual operation of diaphragm setting ring 17 so as to vary the size of the diaphragm aperture formed by diaphragm blades 7. It should be noted that lenses 1 through 6 are designed such that their image forming properties are relatively stable even when the space between lenses 3 and 4 varies slightly. Lenses 1 through 6 are so designed as to effect focusing by the movement of all of the lenses 1 through 6 along the optical axis or the movement of lenses 4 through 6 relative to the lenses 1 through 3.

Manual focusing ring 12 is connected through a helicoid coupling to fixed barrel 15, with diaphragm setting ring 17 for diaphragm aperture setting being rotatably supported by fixed barrel 15. In addition, first movable barrel 9 supporting lenses 1 through 3 and the diaphragm mechanism is connected through a helicoid coupling to manual focusing ring 12. Guide pin 19 formed integrally with fixed barrel 15 extends into guide hole 9a formed in first movable barrel 9 in parallel to the optical axis, whereby the rotation of first movable barrel 9 relative to fixed barrel 15 is restricted. Second movable barrel 10 supporting lenses 4 through 6 is connected through a helicoid coupling to first movable barrel 9. Formed on the circumferential surface of barrel 10 is a guide recess 10a into which guide portion 26 is engageable.

With the above construction, when manual focusing ring 12 is rotated relative to fixed barrel 15, first movable barrel 9 is moved along the optical axis without being rotated relative to fixed barrel 15 as stated above. Consequently, second movable barrel 10 is also moved along the optical axis integrally with first movable barrel 9 without being rotated relative to fixed barrel 15.

Figure 2:
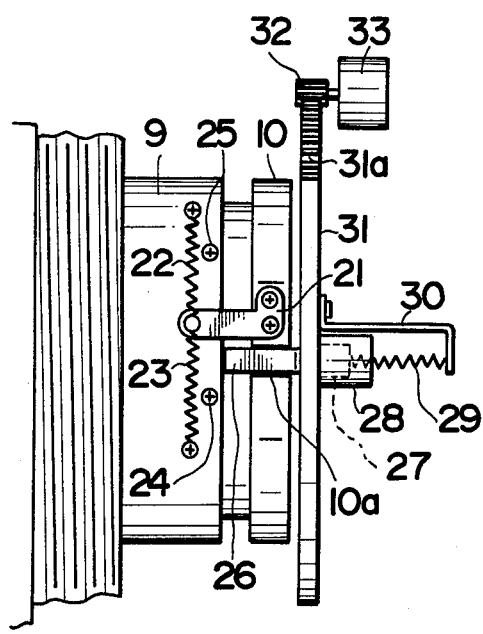
FIG. 2 is a side elevational view illustrating engagement between movable barrels and the connection between the movable barrels and a driving mechanism in the first embodiment.

Description will now be given of the relationship between first movable barrel 9 and second movable barrel 10, and a drive system for second movable barrel 10 with reference to FIGS. 1 and 2. Referring to FIG. 2, arm member 21 is secured on second movable barrel 10. Springs 22 and 23 are tensioned between arm member 21 and peripherally spaced fixed points on first movable barrel 10 to maintain second movable barrel 10 at a predetermined angular position relative to first movable barrel 9 when second movable barrel 10 is free from an external force. Fixed to first movable barrel 9 are stoppers 24 and 25 on which arm 21 fixed to second movable barrel 10 is abuttable when second movable barrel 10 is rotated relative to first movable barrel 9.

With the above construction, when no external force is applied to second movable barrel 10, the angular position of second movable barrel 10 relative to first movable barrel 9 is maintained constant by springs 22 and 23. In addition, the rotational movement of second movable barrel 10 relative to first movable barrel 9 is blocked when arm member 21 fixed to second movable barrel 10 abuts upon stopper 24 or 25 fixed to first movable barrel 9. Since first movable barrel 9 and second movable barrel 10 are connected each other through a helicoid coupling, the amount of angular movement of second movable barrel 10 relative to the first movable barrel 9 is limited to a predetermined angle by stoppers 24 and 25. This means that the amount of the axial movement of second movable barrel 10 is also limited. In the present embodiment, second movable barrel 10 is constructed such that it is movable as much as ±1 mm along the optical axis relative to first movable barrel 9.

Actuating ring 31 is rotatably mounted to a camera body (not shown), and gear portion 31a is formed partially on the circumference of actuating ring 31. Engaged with gear portion 31a is pinion gear 32 fixed to the drive shaft of a motor 33 that is controlled by an automatic focus control device (not shown). Also fixed to actuating ring 31 are electromagnet 28 and spring holding plate 30. Electromagnet 28 is activated when an automatic focus operating or actuating switch (not shown) provided on the lens barrel or the camera body is closed, while it is deactivated when the automatic focus operating switch is opened. Core 27 of electromagnet 28 is movable parallel to the optical axis (i.e., in the horizontal or lateral direction in FIGS. 1 and 2), and one end of spring 29 is fixed to the rear end of core 27. The other end of spring 29 is fixed to spring holding plate 30, thereby causing core 27 to be retracted (i.e., to the right in the Figures) when electromagnet 28 remains deactivated. Core 27 is moved forward (i.e., to the left in FIGS. 1 and 2) against the action of spring 29 when electromagnet 28 is activated. Furthermore, fixed integrally to the tip of core 27 is guide portion 26 engageable into recess 10a formed on the circumferential portion of second movable barrel 10.

With the above construction, when an automatic focus actuation switch (not shown) is closed, electromagnet 28 fixed to actuating ring 31 is activated to move forward guide portion 26 which is integrally formed with core 27, whereby guide portion 26 is engaged into recess 10a of second movable barrel 10, thereby coupling actuating ring 31 to second movable barrel 10. So long as the automatic focus actuation switch is kept closed, guide portion 26 is always biased forward. Accordingly, if guide portion 26 is not at the position to align with and engage into recess 10a of second movable barrel 10, actuating ring 31 is at first separately rotated by motor 33 to bring guide portion 26 into registration with recess 10a so that guide portion 26 engages recess 10a of second movable barrel 10 to couple the latter with actuating ring 31. Second movable barrel 10 is then rotated by motor 33, and at this moment, the amount of angular movement of second movable barrel 10 relative to first movable barrel 9, and accordingly the amount of axial movement thereof is limited or restricted by stoppers 24 and 25. With the present embodiment, the interval between stoppers 24 and 25 is set so that second movable barrel 10 is movable as much as ±1 mm along the optical axis relative to first movable barrel 9 from the initial state where springs 22 and 23 are balanced in tension for arm member 21.

When an automatic focus actuating switch (not shown) is opened, electromagnet 28 is deactivated, causing core 27 and guide portion 26 to be retracted under the action of spring 29, whereby guide portion 26 is retracted from recess portion 10a of second movable barrel 10 and as a result, the rotation of actuating ring 31 is not transmitted to second movable barrel 10. This means that external force is no longer applied to second movable barrel 10, and arm member 21 fixed thereto is rotated by spring 22 or 23 until the tension of springs 22 and 23 for arm member 21 becomes balanced. With the above construction, the relative position of first movable barrel 9 and second movable barrel 10 is always maintained constant when automatic focusing is not performed.

It should be understood that the lengths of guide portion 26, core 27 and other related elements are determined such that guide portion 26 may engage recess 10a of second movable barrel 10 at any axial position of the latter when the automatic focus actuating switch is closed, while guide portion 26 may completely be retracted from recess portion 10a of second movable barrel 10 at any axial position of the latter when the automatic focus actuating switch is opened.

Figure 3:
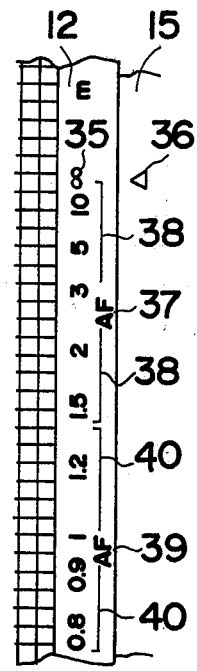
FIG. 3 is a schematic view of an indication scale of the first embodiment.

FIG. 3 is a schematic view of an indication scale or graduation for indicating the focusable distance of an objective with manual focus control and the focusable distance range with automatic focus control. With reference to FIG. 3, distance scale 35 is provided on the circumferential surface of manual focusing ring 12. Index 36 is disposed on the circumferential surface of fixed barrel 15. In manual focus control, the number on distance scale 35 that is in registry with index 36 represents the object distance on which the objective lens is focused. Automatic focus mark 37 is provided on the circumferential surface of manual focusing ring 12, and mark 38 indicates the focusable distance range when automatic focus mark 37 is coincident with index 36 to select automatic focus control mode. Similarly, mark 40 indicates the focusable distance range when automatic focus mark 39 is coincident with index 36 to select another automatic focus control mode. Since the amount of the axial movement of second movable barrel 10 relative to first movable barrel 9 is limited as mentioned earlier, the range indicated by the mark 38 or 40 corresponds to the amount of the movement of second movable barrel 10. When automatic focusing is performed with automatic focus mark 37 being moved into registry with index 36, for instance, an automatic driving or focusing mechanism automatically shifts the objective to be focussed on a predetermined object distance within the range of approximately 1.4 m to infinity (∞). It is to be noted that automatic focusing is possible even if automatic focus mark 37 or 39 is not in registration with index 36. In this case, however, the focusable range is not the one indicated by mark 38 or 40. When, for example, "1.5" on distance scale 35 is in registry with index 36, the automatic focusing mechanism can adjust the focusing within the object distance of approximately 1 m to 3 m.

An explanation follows of the operation of the present embodiment with the above construction. First, for manual focus control, an automatic focus operating switch (not shown) is open to maintain electromagnet 28 deactivated. Therefore, no external driving force is applied to second movable barrel 10, as described above, whereby the relative position between first movable barrel 9 and second movable barrel 10 is maintained constant under the action of springs 22 and 23. Under such condition, when manual focusing ring 12 is rotated manually relative to fixed barrel 15, focusing ring 12 is moved along the optical axis under the guidance of the helicoid thread of fixed barrel 15. First movable barrel 9 connected to manual focusing ring 12 is also moved along the optical axis. However, since first movable barrel 9 is restrained by guide pin 19 from rotation relative to fixed barrel 15, first movable barrel 9 is translated along the optical axis. When first movable barrel 9 is moved along the optical axis, second movable barrel 10, whose relative position to first movable barrel 9 along the optical axis is maintained constant, is also translated integrally with first movable barrel 9. Therefore, lenses 1 through 6 supported by first movable barrel 9 and second movable barrel 10 are integrally moved without rotation along the optical axis, whereby manual focusing is performed. The object distance focused in the manual focusing mode is indicated by the number on distance scale 35 which is confronted by index 36 on fixed barrel 15.

For automatic focus control, the automatic focus operating switch (not shown) is closed to energize electromagnet 28. Then, guide portion 26 rotatable integrally with actuating ring 31 engages recess 10a of second movable barrel 10 as described above, whereby a drive system including motor 33 is connected to second movable barrel 10. Even if, the second movable barrel 10 is left at any position along the optical axis after the manual focusing operation, the second movable barrel 10 is, without fail, connected to the drive system when guide portion 26 is moved forward parallel to the optical axis (i.e., to the left in FIGS. 1 and 2). This is because the recess 10a is always kept in alignment with guide portion 26 since the movement of the second movable barrel is restricted to a straight direction parallel to the optical axis. When motor 33 is driven under the control of an automatic focus control device (not shown), actuating ring 31 is rotated as described above, whereby second movable barrel 10 connected to actuating ring 31 is rotated. Since second movable barrel 10 is connected by helicoid coupling to first movable barrel 9 whose rotational movement relative to fixed barrel 15 is prevented, second movable barrel 10 is moved along the optical axis. At this time, the amount of axial movement of second movable barrel 10 relative to first movable barrel 9 is limited by stoppers 24 and 25, as described earlier. Thus, lenses 4 through 6 supported by second movable barrel 10 are moved along the optical axis with rotation while lenses 1 through 3 held by first movable barrel 9 are not moved, whereby focussing is effected. At this condition, the entire lenses 1 through 6 may be moved along the optical axis by manually operating manual focussing ring 12. In this case, the focusing of the entire lens system is a function of the combined effects of the movement of the lenses 1 through 6 relative to the fixed barrel by manual focusing ring 12 and the movement of lenses 4 through 6 relative to lenses 1 through 3 by actuating ring 31. For automatic focus control, when automatic focus mark 37 on manual focusing ring 12 is manually brought into registry with index 36 on fixed barrel 15, lenses 4 through 6 are moved relative to lenses 1 through 3 within the range limited by stoppers 24 and 25, whereby automatic focusing is made in the range of approximately 1.4 m to infinity (∞) as indicated by mark 38. As stated above, changeover from manual focusing control to automatic focus control is possible without bringing automatic focus mark 37 or 39 into registry with index 36, and in this case, the only difference lies in that the focusable range does not correspond to the range shown by mark 38 or 40.

A changeover from automatic focus control to manual focus control is possible at any time merely by opening an automatic focus actuating switch (not shown). When the automatic focus actuating switch (not shown) is opened, electromagnet 28 is deactivated, causing guide portion 26 to retract from recess portion 10a of second movable barrel 10 under the action of spring 29.

As a result, the drive system and second movable barrel 10 are disconnected from each other, causing the external driving force to be no longer transmitted to second movable barrel 10. This means that second movable barrel 10 is rotated by the spring 22 or 23 until it reaches a predetermined angular position where the respective tensions of spring 22 and 23 are balanced. When the second movable barrel reaches the predetermined angular position, the object distance being focused is indicated by the number on the scale 35 of manual focusing ring 12 that is confronted by index 36 on fixed barrel 15.

Figure 4:
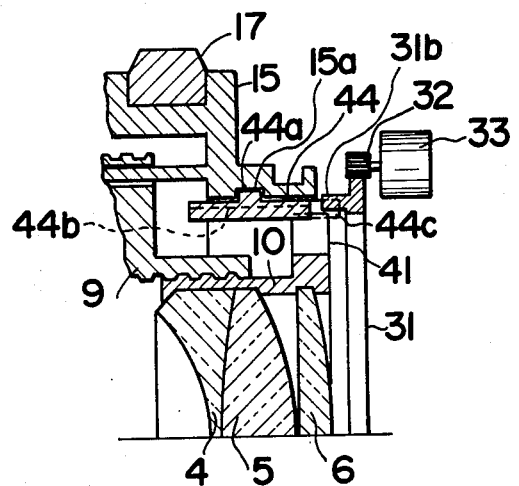
FIG. 4 is a fragmentary cross-sectional view of the principal part of a second embodiment.
Figure 5:
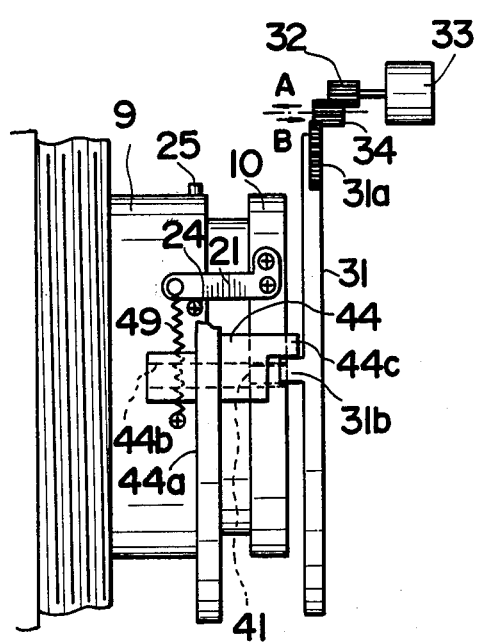
FIG. 5 is a side elevational view illustrating the engagement between the movable barrels and the connection between the movable barrels and the driving mechanism of the second embodiment.
Figure 6:
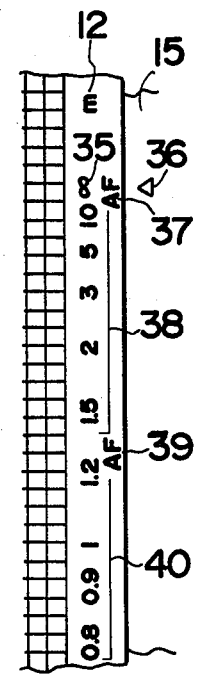
FIG. 6 is a schematic view of an indication scale of the second embodiment.

FIGS. 4 through 6 show a second embodiment of the present invention, wherein the same reference numerals are used for members corresponding to those of the first embodiment in FIGS. 1 through 3, and the description thereof is omitted. In FIG. 4, the manual focusing mechanism is exactly the same as shown in FIG. 1 and is accordingly not shown in FIG. 4 for the simplicity of illustration.

With reference to FIGS. 4 and 5, second movable barrel 10 is connected by a helicoid coupling to first movable barrel 9 as in the first embodiment. When rotated, second movable barrel 10 is movable along the optical axis relative to first movable barrel 9. In addition, radially projecting guide portion 41 is fixed to the circumference at the rear end of second movable barrel 10 in place of recess 10a in the first embodiment. The head of guide portion 41 engages guide groove 44b of relay ring 44. Relay ring 44 is rotatably supported by fixed barrel 15 with projection 44a being engaged by circumferential groove 15a formed circumferentially on the inner surface of fixed barrel 15. Formed on the inner circumferential surface of relay ring 44 is guide groove 44b extending parallel to the optical axis, with which the head of guide portion 41 is slidably engaged. Also formed at the rear end of relay ring 44 is engaging claw 44c which is engageable with engaging claw 31b formed on actuating ring 31. The length of guide groove 44b is set such that guide portion 41 of second movable barrel 10 remains unremoved from guide groove 44b of relay ring 44 even when second movable barrel 10 is translated along the optical axis. Furthermore, one end of spring 49 is fixed to the top end of arm member 21 which is fixed to second movable barrel 10, while the other end of spring 49 is fixed to first movable barrel 9. When second movable barrel 10 is free of external force, arm member 21 fixed to second movable barrel 10 abuts stopper 24 under the action of spring 49.

With the present embodiment, second movable barrel 10 is maintained at a predetermined angular position relative to first movable barrel 9 by virtue of spring 49 and stopper 24, and therefore, springs 22 and 23 in the first embodiment are not provided therein. In addition, the connection between actuating ring 31 and second movable barrel 10 is made in the present embodiment by way of engaging claw 31b of actuating ring 31 and engaging claw 44c of relay ring 44. In the above embodiment, the amount of axial movement of second movable barrel 10 relative to first movable barrel 9 is also limited or restricted by stoppers 24 and 25. The interval between stoppers 24 and 25 is set such that second movable barrel 10 is movable along the optical axis as much as ±2 mm for first movable barrel 9. Furthermore, movable gear 34 is interposed between pinion gear 32 and gear portion 31a of actuating ring 31, and movable gear 34 is movable in the direction of arrows A and B. When automatic focus operating switch (not shown) is opened, movable gear 34 is moved from the position shown in the Figure in the direction of arrow B to be disengaged from gear portion 31a of actuating ring 31, whereby gear portion 31a is not driven by motor 33.

With the above construction, manual focusing is performed in exactly the same manner as in the first embodiment. In the instant case, guide portion 41 fixed to second movable barrel 10 slides on guide groove 44b of relay ring 44.

When the automatic focus operating switch (not shown) is closed, movable gear 34 is moved in the direction of arrow A to the position shown in FIG. 5 where it meshes with both pinion gear 32 and gear portion 31a. When motor 33 is rotated while it is controlled by an automatic focus control device (not shown), second movable barrel 10 is rotated through relay ring 44, and thus moved along the optical axis relative to first movable barrel 9. The amount of movement of second movable barrel 10 relative to first movable barrel 9 is restricted by stoppers 24 and 25, as described earlier. Thus, lenses 4 through 6 held by second movable barrel 10 are moved relative to lenses 1 through 3 held by first movable barrel 9, whereby automatic focusing is performed. In the second embodiment, automatic focus control is possible with lenses 1 through 6 being left at any position on the optical axis. Therefore, automatic focus control may be quickly performed when focusing for an object is roughly made by the manual focus control prior to changeover to automatic focus control.

When the automatic focus operating switch (not shown) is opened, motor 33 and actuating ring 31 are disconnected from each other, as described earlier, thereby causing second movable barrel 10, relay ring 44 and actuating ring 31 to be all reset to the position as shown in FIG. 5. With the above embodiment, motor 33 serves to rotate actuating ring 31 only in one direction. Accordingly the motor may be replaced by a spring to rotate actuating ring 31, and the rotation of actuating ring 31 is stopped after a lapse of any desired time from the intiation of the rotation according to the output signal from an automatic focus control device.

FIG. 6 is a schematic view illustrating a distance indication scale of the second embodiment. The difference between the first and second embodiments lies only in the position of automatic focus marks 37 and 39 as seen in FIG. 3. That is, in manual focusing mode with the second embodiment, second movable barrel 10 is spaced apart from first movable barrel 9 to the extremity of the available range along the optical axis, and second movable barrel 10 is driven from such extreme position toward first movable barrel 9 by means of an automatic focusing mechanism. Therefore, the automatic focusing mechanism can adjust the focusing of the objective for an object distance smaller than manually available. Accordingly, automatic focus marks 37 and 39 are disposed at each largest distance position of the automatically focusible range.

Shown below are the numerical examples of the relationships between the focused object distance and the amount of axial movement of second movable barrel 10 relative to first movable barrel 9 in the first and second embodiments, when the automatic focusing mechanism is actuated with automatic focus mark 37 or 39 in registry with index 36:

| In-focus distance (m) | Amount of shift (mm) | |
|---|---|---|
| | First embodiment | Second embodiment |
| ∞ | | |
| 10 | ⎡ −1.00 | AF   0.00 |
| 5 |    −0.73 |    +0.27 |
| 3 |    −0.47 |    +0.54 |
| 2 | AF −0.09 |    +0.91 |
| 1.5 |    +0.40 | ⎣ +1.40 |
| | ⎣ +0.89 | |
| 1.2 | | AF +1.89 |
| 1 | ⎡ −0.59 |    +0.41 |
| 0.9 | AF −0.05 |    +0.95 |
| 0.8 |    +0.32 |    +1.32 |
| | ⎣ +0.79 | ⎣ +1.79 |

Figure 7:
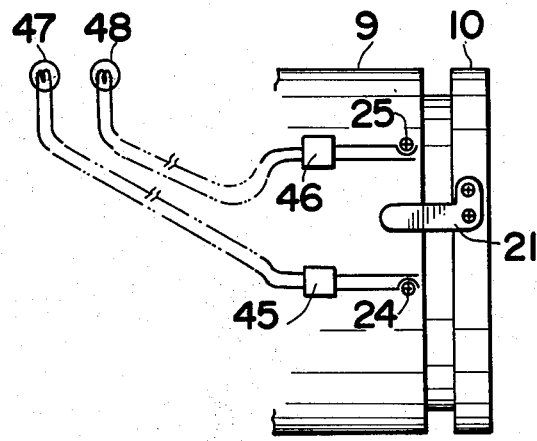
FIG. 7 is a schematic view of the principal part of an electric warning means.

FIG. 7 is a schematic view of an electric warning means which may be provided in the first and second embodiments. Referring to FIG. 7, switches 45 and 46 positioned on first movable barrel 9 can be closed respectively by arm member 21 fixed to second movable barrel 10 immediately before the arm member 21 abuts on stopper 24 or 25. Warning lamps 47 and 48 provided on a camera body or inside a viewfinder light up and go out in response to the opening and closing of switches 45 and 46, respectively. Switch 45 is closed immediately before the arm member 21 engages stopper 24, thereby causing warning lamp 47 to light up, and conversely before the arm 21 engages stopper 25, switch 46 is closed causing warning lamp 48 to light up.

With the above construction, it is possible to inform a photographer that second movable barrel is stopped whether in its most retracted position or most advanced position along the optical axis relative to the first movable barrel. This structure is convenient in selecting the focus adjustment range for an automatic focusing mechanism (e.g., either the range of mark 38 or that of mark 40 as shown in FIG. 3).

Furthermore, according to the first and second embodiments, even if an attachment is mounted to the front most end of first movable barrel 9, the weight of such attachment does not affect the automatic focusing mechanism. Therefore, even in such case, the automatic focusing mechanism is capable of moving the lens group at high speed with a small power output.

Figure 8:
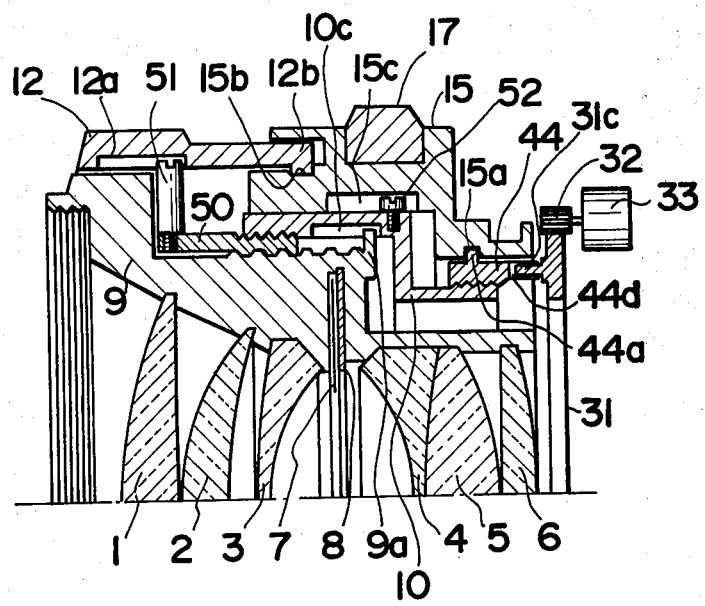
FIG. 8 is a semi cross-sectional view of a third embodiment of the present invention.

FIG. 8 is a semi cross-sectional view of a third embodiment of the present invention, where the same reference numerals are used for members corresponding to those of the first and second embodiments, and the description thereof is omitted.

With reference to FIG. 8, first movable barrel 9 supports all of lenses 1 through 6, diaphragm blade 7 and diaphragm actuating plate 8, and second movable barrel 10 supports no lens. Inner barrel 50 is connected by helicoid coupling to both first movable barrel 9 and second movable barrel 10. Pin 51 carried by inner barrel 50 at the front end thereof is received by axially extending pin guide groove 12a formed on the inner surface of manual focusing ring 12. Furthermore, formed at the rear end of manual focusing ring 12 is bent portion 12b which extends radially towards the optical axis and which is received by circumferential groove 15b formed circumferentially on fixed barrel 15. With the above construction, when manual focusing ring 12 is manually rotated, the rotation thereof is transmitted to inner barrel 50. Manual focusing ring 12 is arranged not to move along the optical axis relative to fixed barrel 15. Further, when inner barrel 50 is otherwise translated along the optical axis, manual focusing ring 12 is not moved.

Formed on the circumference of first movable barrel 9 is projection 9a which is otherwise engaged by guide groove 10c, extending parallel to the optical axis and formed on the inner circumferential surface of second movable barrel 10. Therefore, the rotational movement of first movable barrel 9 relative to second movable barrel 10 is restrained. In addition, second movable barrel 10 carries pin 52 which engages guide groove 15c extending parallel to the optical axis and formed on the inner circumferential surface of fixed barrel 15, whereby the rotational movement of second movable barrel 10 relative to fixed 15 is restrained. Moreover, the rear of second movable barrel 10 is connected by a helicoid coupling to relay ring 44, whose rear end is formed with recess 44d with which projection 31c of actuating ring 31 is engaged. With the third embodiment, when an automatic focus operating switch (not shown) is closed, motor 33 is driven under the control of an automatic focusing device. When the automatic focus operation switch is opened, motor 33 resets actuating ring 31 to a predetermined position and then stops its drive operation. In addition, the movement of second movable barrel 10 relative to fixed barrel 15 by the automatic focusing mechanism is restricted by stoppers 24 and 25 and arm 21 as in the first and second embodiments being provided on fixed barrel 15 and relay ring 44, respectively.

With the above construction, motor 33 is not driven in the manual focusing mode, and second movable barrel 10 is always maintained at a predetermined position relative to fixed barrel 15. When manual focusing ring 12 is rotated, first movable barrel 9 is translated relative to fixed barrel 15, whereby focusing is performed.

When the automatic focus actuating switch (not shown) is closed and motor 33 is driven by the automatic focusing device (not shown), relay ring 44 is rotated through actuating ring 31, whereby second movable barrel 10, relay ring 44 and first movable barrel 9 are moved along the optical axis integrally with each other. In this case, it is possible to move first movable barrel 9 relative to second movable barrel 10 by manually operating manual focusing ring 12, and consequently, the focusing effect by lenses 1 through 6 is obtained by the sum of the amount of shift of second movable barrel 10 relative to fixed barrel 15 and the amount of shift of first movable barrel 9 relative to second movable barrel 10.

When the automatic focus actuating switch (not shown) is opened, actuating ring 31 is rotated to return to the predetermined position and remains in that position and therefore, the distance scale always indicates the distance which precisely corresponds to an object distance being manually focused.

Thus, according to the present embodiment, first movable barrel 9 supporting the lens group is moved along the optical axis both for manual focusing using a manual focusing mechanism alone, and automatic focusing using manual and automatic focusing mechanisms. This structure is advantageous when a diaphragm is provided.

With all of the above embodiments, it is possible to provide an adequate operational torque for a manual focusing mechanism, wherein grease lubrication is applied to the helicoid coupling between manual focusing ring 12, fixed barrel 15 and first movable barrel 9, respectively, in the first and second embodiments and the helicoid coupling between inner barrel 50, first and second movable barrels 9 and 10 in the third embodiment. It is also possible to move the lens group at high speed with a small output from an automatic focusing mechanism, wherein solid lubrication is applied to the helicoid coupling between relay ring 44 and second movable barrel 10 in the third embodiment.

It should be noted that the present invention is not limited to the above three embodiments, and helicoid coupling may be replaced by pin and cam-groove couplings. Also as the means for maintaining movable barrels in the predetermined positions for automatic focusing, a magnetic means may be employed which makes use of a magnet instead of springs in the preceding embodiments. Furthermore, the embodiments are shown as applied to an objective lens for a single-lens reflex camera. However, the present invention is not limited to that application but is also applicable to a lens of a coupled range finder camera.

As many apparantly widely different embodiments of this invention may be made without departing from the spirit and scope thereof, it is to be understood that the invention is not limited to the specific embodiments thereof except as defined in the appended claims.

What is claimed is:

1. An objective lens assembly for use with a camera which includes an automatic focus control device having a driving mechanism, comprising:
   a manually movable focussing ring;
   first and second lens groups disposed along a common optical axis, said first and second lens groups being capable of changing focus not only when said both lens groups are concurrently shifted along the optical axis but also when either one of said lens groups is shifted relative to the other along the optical axis;
   a first movable barrel carrying said first lens group;
   a second movable barrel carrying said second lens group, said second movable barrel being movably supported by said first movable barrel so as to be integrally moved with said first movable barrel;
   first means interconnecting said manual focussing ring with said first movable barrel such that said first movable barrel is moved along the optical axis in response to the movement of said manual focussing ring, thereby moving said first and second lens groups concurrently along the optical axis; and
   means for interconnecting said second movable barrel to said driving mechanism so that said second movable barrel is automatically moved, thereby said second lens group being moved relative to the first lens group along the optical axis.

2. An objective lens assembly as set forth in claim 1, further comprising means for deenergizing said interconnecting means so that said second movable barrel is free from the control of said driving mechanism upon manual focus control and means for maintaining said second movable barrel at a predetermined position relative to said first movable barrel when said second barrel is free from the control of said driving mechanism.

3. An objective lens assembly as set forth in claim 1, wherein said second movable barrel is rotatably engaged with said first movable barrel through a helicoid coupling, and said lens barrel further comprising means for limiting the amount of the rotational movement of said second movable barrel relative to said first movable barrel.

4. An objective lens assembly as set forth in claim 3, further comprising electric warning means which is actuated when said second movable barrel reaches at end of rotational movement.

5. In a camera including an automatic focus electric drive motor, an objective lens comprising a pair of first and second lens groups having a common optical axis and each including at least one lens, first focusing means including a manual focusing member for manually axially shifting said first and second lens groups as an integral unit for adjusting the focus of said objective lens and second focusing means driven by said electric drive motor for axially shifting said first lens group relative to said second lens group while leaving said second lens group stationary.

6. The objective lens of claim 5 wherein said first focusing means has a greater operational resistance than said second focusing means.

7. The objective lens of claim 5 including means for alternative drive coupling and uncoupling said second focusing means with said motor.

8. The objective lens of claim 5 wherein the range of axial movement of said first lens group relative to said second lens group by said second focusing means is less than the range of axial movement of said lens groups as a unit by said first focusing means.

9. The objective lens of claim 5 further comprising a stationary member which movably supports said manual focusing member.

10. The objective lens of claim 9 further comprising an indicating means for indicating the distance of an object on which said first and second lens groups are focused by said manual focusing member.

11. The objective lens of claim 10 wherein said indicating means includes a distance scale on said manual focusing member and an index produced on said stationary member.

12. The objective lens of claim 6 wherein said first focusing means includes grease lubrication for providing a sufficient operational resistance to the operation of said manual focusing member so that a large torque is required to operate said manual focusing member.

13. The objective lens of claim 12 wherein said second focusing means includes solid lubrication for reducing the resistance of the operation of said second focusing means.

* * * * *